United States Patent [19]
Bloomer et al.

[11] Patent Number: 5,359,708
[45] Date of Patent: Oct. 25, 1994

[54] DYNAMIC IN A DOCUMENT PROCESSING SYSTEM FOR DYNAMICALLY LOCATING FORMAT CONTROLS AND DETERMINING FORMATTING INFORMATION IN EFFECT BEFORE AND AFTER EACH FORMAT CONTROL

[75] Inventors: Holly A. Bloomer; Kenneth A. Zaiken, both of Germantown, Md.

[73] Assignee: International Business Machines Corp., Armonk, N.Y.

[21] Appl. No.: 670,506

[22] Filed: Mar. 15, 1991

Related U.S. Application Data

[63] Continuation of Ser. No. 208,520, Jun. 15, 1988, abandoned.

[51] Int. Cl.⁵ .............................. G06F 3/00
[52] U.S. Cl. .................. 395/148; 395/600; 364/DIG. 2; 364/943.43; 364/943.44; 400/63; 400/76
[58] Field of Search ............... 395/600, 144, 145, 148, 395/155, 156, 425, 725; 364/419; 400/63, 76

[56] References Cited

U.S. PATENT DOCUMENTS

| | | | |
|---|---|---|---|
| 4,357,680 | 11/1982 | Greek, Jr. et al. | 364/900 |
| 4,607,966 | 8/1986 | Ueno et al. | 400/63 |
| 4,686,649 | 8/1987 | Rush et al. | 364/900 |
| 4,731,735 | 3/1988 | Borgendale et al. | 364/200 |
| 4,751,674 | 6/1988 | Aoyagi et al. | 364/900 |
| 4,807,142 | 2/1989 | Agarwal | 364/200 |
| 4,827,447 | 5/1989 | Croes et al. | 364/900 |
| 4,829,474 | 5/1989 | Ikawa | 364/900 |
| 4,831,583 | 5/1989 | Pascoe | 395/148 |
| 4,881,197 | 11/1989 | Fischer | 364/900 |
| 5,182,709 | 1/1993 | Makus | 395/146 |

OTHER PUBLICATIONS

IBM *Technical Disclosure Bulletin*, vol. 25, No. 1, Jun. 1982, "Format Control Functions", pp. 217–220, to Adam, et al.

IBM *Technical Disclosure Bulletin*, vol. 29, No. 7, Dec. 1986, "Method to Provide Return of Complex Format Controls in an Internal Word Processor Data Stream", to Horn and Pienta.

Primary Examiner—Thomas C. Lee
Assistant Examiner—Peter Y. Wang
Attorney, Agent, or Firm—Lauren C. Bruzzone; Jeffery S. La Baw

[57] ABSTRACT

A method of scanning and detecting format code changes is disclosed. The method is preferably utilized in a data processing system which includes a central processing unit, a random access memory, a bulk storage device, a display device and a printer. The method scans a document for format controls, detects a format control, retrieves information about the format characteristics in effect before and after that control, organizes that format characteristic information in a menu and displays that menu to the user. This method minimizes the amount of time spent editing format controls in a large document by fully informing the user of the underlying format characteristics associated with each format control.

11 Claims, 4 Drawing Sheets

DYNAMIC IN A DOCUMENT PROCESSING SYSTEM FOR DYNAMICALLY LOCATING FORMAT CONTROLS AND DETERMINING FORMATTING INFORMATION IN EFFECT BEFORE AND AFTER EACH FORMAT CONTROL

CROSS REFERENCE TO RELATED APPLICATION

This application is a continuation application of U.S. Ser. No. 07/208,520 filed Jun. 15, 1988, now abandoned.

BACKGROUND OF THE INVENTION

The present invention relates generally to text processing, and more particularly, to methods for scanning and detecting format code changes within a word processing document.

One of the most popular applications of modern computer technology is in the field of text or word processing. Yet many problems still persist in the accurate representation to the user of a document in its final formatted form on a display screen. Most word processors fail to reach the ideal WYSIWYG (what you see is what you get) presentation to the user; instead, the way a document page looks on the screen is not identical to the way it will look on a printed page.

One of the greatest problems in the partial WYSIWYG word processors is that the effect of the various format controls on the final document is largely hidden from the user. Most often, the user sees only the format control itself and not underlying characteristics of the control. The ability of the user to understand the effect of a particular format control is limited, and lacks a clear picture of what changes in the document were caused by the format control. Frequently, some of the format changes caused by the format control cannot be seen on the screen, and show up only when the document is printed. In a long document (50 pages or more are not uncommon) which has undergone much revision and has many format changes, it is unacceptable to discover each undesired format change at print time, to print the document yet again and find still more undesired format changes.

The prior methods for dealing with this problem all suffer from limitations. The most prevalent method is to present a menu which displays the current format characteristics for a given point within a document. While this menu is helpful, it does not inform the user as to how the current format characteristics came about; i.e., which format controls caused which changes to the starting document format. Without information on the location as to where a given format characteristic change takes effect, it is difficult to implement a new change in that format characteristic. To some degree, a user can deduce where a format change has taken place by scrolling the document and displaying the menu at various points in the document. However, this is very time consuming and clearly unacceptable where large documents are being modified.

A second prior art method is a variation on the first method. A menu is presented to the user specifically at each format control when the cursor is on a spot in the data stream which corresponds to the format control. The menu contains the format characteristics associated with a given format control. While this method allows the user to understand where formatting changes occur within the document, and therefore, where to make new modifications to the format of the document, it suffers, as does the first method, in that information is presented for only one location within the document.

The limitations of the prior art can be understood by the following example: A user is in the process of formatting a long document with a large number of format changes, some portions of text would be double-spaced, others single-spaced and with indented margins. A given page of the document is to be printed in a double-spaced format. During the formatting process, the user has located a format control which could effect line spacing, e.g., a line format change control. In this example, if the user utilizes one of the methods described above at the line format change control, he will see that double line spacing is in effect as a result of the control. However, without repetitious scrolling of the cursor the user cannot determine whether the control is actually needed to effect line spacing at that point, since line spacing before the line format change control may also be double spaced.

In the sophisticated word and text processors of today many changes in format can occur at a given format control. It may be possible, though unwieldy, to keep track of a single format parameter, e.g., line spacing as in the above example, through the use of repetitive scrolling in prior art methods. However, where many format changes take place at the format controls within a document, it becomes very difficult for the user to keep track of all the format changes which occur at various points in the document. Inevitably, mistakes will be made only to be discovered at print time. The user will correct the format control and print the document again, only to find that a later format control, hidden by the first format control, will now sabotage his efforts.

SUMMARY OF THE INVENTION

It is therefore an object of the invention to provide a means of quickly scanning a text document for format changes within a word or text processing system.

It is another object of the invention to display to the user the format characteristics in place prior to a format control in the document as well as those in effect after the format control in the document which occur as a result of the format control.

It is yet another object of the invention to minimize the amount of time required to revise format characteristics within large documents.

These and other objects of the invention are accomplished within a data processing system including a central processing unit, a random access memory, a bulk storage device, and further including a display device and a printer. The method for scanning and detecting format code changes within a document comprises the steps of organizing a database representation of a document which includes format controls, reading this document database into the random access memory, scanning the document database for a first format control, detecting the first format control, retrieving and storing information about the format characteristics in effect before and after the format control, organizing the format characteristic information in a menu and displaying that menu to the user.

At the menu, the user can change the format value in effect at the format control, delete the format control being displayed, continue scanning the document for the next format control or stop the scan of the document to proceed to other word processing tasks. If the user elects to continue scanning for a second format control, the method further comprises the steps of scanning the document database for a second format control, detecting the second format control, retrieving and storing information about the format characteristics in effect before and after the second format control, organizing the format characteristic information in a second menu, and displaying that second menu to the user.

BRIEF DESCRIPTION OF THE FIGURES

The above and other objects, features, and advantages will be more fully appreciated with reference to the accompanying figures.

Table 1 in an Appendix is a mapping of a primitive function called LFMT.

Table 2 in an Appendix is a depiction of the appearance of a sample document as it would be displayed to a user on an alphanumeric display.

Table 3 in an Appendix depicts a line format change menu as it would be displayed to the user while scanning the document in FIG. 4.

Table 4 in an Appendix depicts a page format change menu as it would be displayed to a user while scanning the document in FIG. 4.

Table 5 and 6, respectively, in an Appendix depict the same page format change menu shown in FIG. 6 as it would be displayed to the user while scanning the document on a 24-line display device.

Tables 7 and 8, respectively, in an Appendix show the first and second pages of the document in FIG. 4 as it will appear in final printed form.

DESCRIPTION OF THE BEST MODE FOR CARRYING OUT THE INVENTION

The invention can be utilized in the distributed data processing system described in U.S. Pat. No. 4,731,735 entitled "Multi-Lingual Processing for Screen Image Build and Command Decode in a Word Processor, With Full Command, Message and Help Support," by K. W. Borgendale, et al., which is incorporated herein by reference. The invention disclosed herein can also be implemented in the stand-alone processor such as a personal computer.

Figure 1:
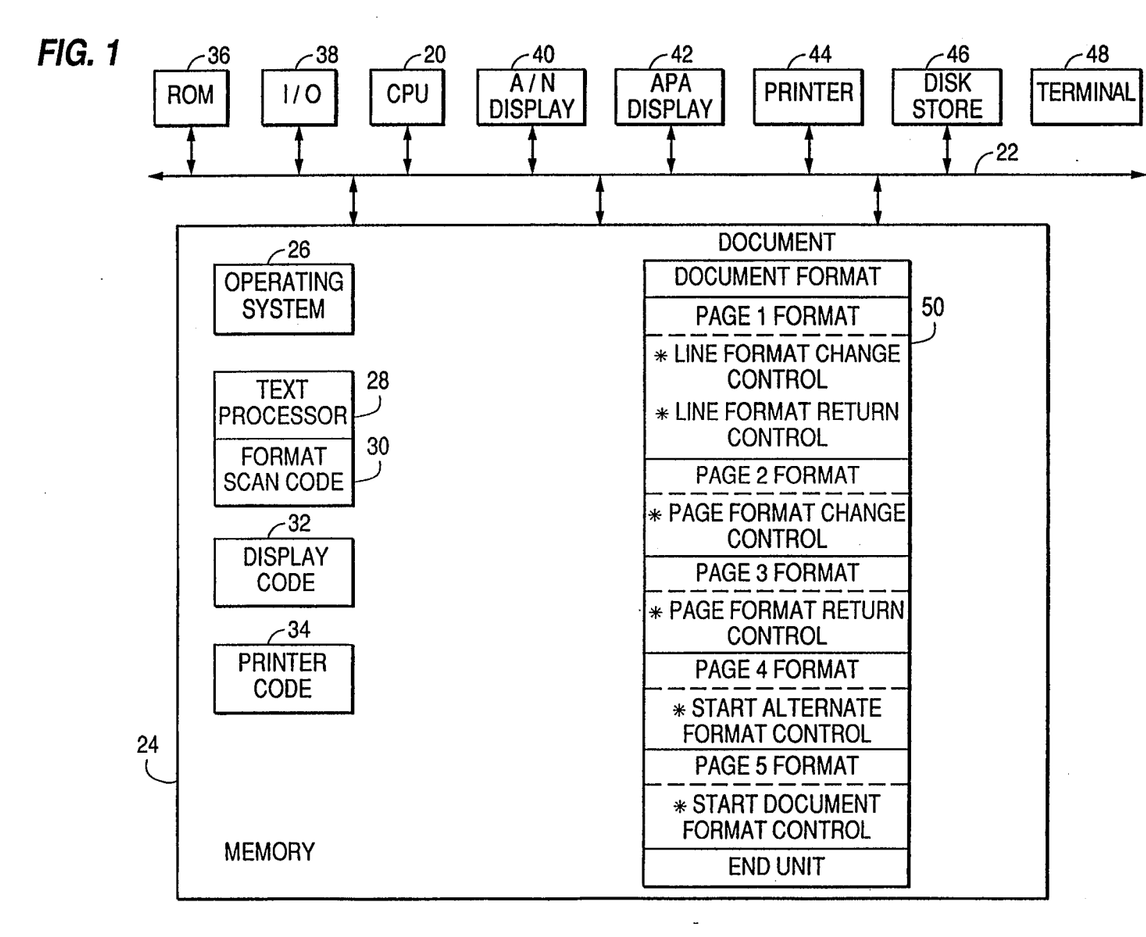
FIG. 1 is an architectural block diagram of a data processor, depicting the memory having read therein a first document.

The preferred embodiment of the invention comprises a set of programs for controlling a text processing system as shown in FIG. 1. The architectural block diagram of FIG. 1 includes a central processing unit (CPU) 20 connected by a system bus 22 to a random access memory 24. The random access memory 24 stores the programs which include an operating system 26, a text processor 28 which includes the format scan code 30, display code 32, and printer code 34. Also included in the text processing system in FIG. 1 is a read-only memory 36 to carry out elementary operations for the CPU 20. The I/O 38 can be connected to communications lines or to other I/O equipment. The alphanumeric (A/N) display 40 can display text; however, it is not capable of displaying individual pels of visual information as is the all points addressable display 42. Also included in FIG. 1, is a printer 44 for the eventual print of a text processing document 50, and disk storage 46, which is capable of storing a file of a document such as document 50. The system further includes a user terminal with a keyboard or other data input means for entering text processing document 50 into the text processing system.

Document 50 is generally organized in an internal editing format to include a document format unit, which may include both primary and alternate document format characteristics. Document 50 further includes five pages, each of which begins with a data area containing the initial page format for that page.

If these initial page format areas were not included, a format control on the last page of the Document 50 would make it necessary for the text processor 28 to go back to the document format data area on the first page, make appropriate adjustment for any intervening format controls before, and; finally, implement the changes called for by the format control on the last page. Particularly in long documents, this cumbersome procedure would have an extremely adverse impact on throughput. Each of the five pages also includes text data and at least one format control which is denoted by an asterisk in FIG. 1.

A short explanation of some of the terminology used by those skilled in the document processing art may be in order. The format of a document in printed form can be described by a collection of format characteristics or format values. As the result of format controls placed in the database representation of the document edited on the document processor system, the format characteristics may change from place to place in the document. A format control is essentially a command to the document processor to change one or more of the format characteristics in effect in the document prior to that particular format control.

In the preferred embodiment, there is a primitive function called LFMT. The map of the function is depicted in FIG. 1 the Appendix Table 1. When invoked, LFMT returns a data area which contains the current format for a given location. The default location for LFMT is the current cursor position. To return the current format data area, LFMT starts at the top of the page where the initial page format data is stored, and then scans the document, making the appropriate adjustments for each format control encountered until the specified location is reached.

Figure 2:
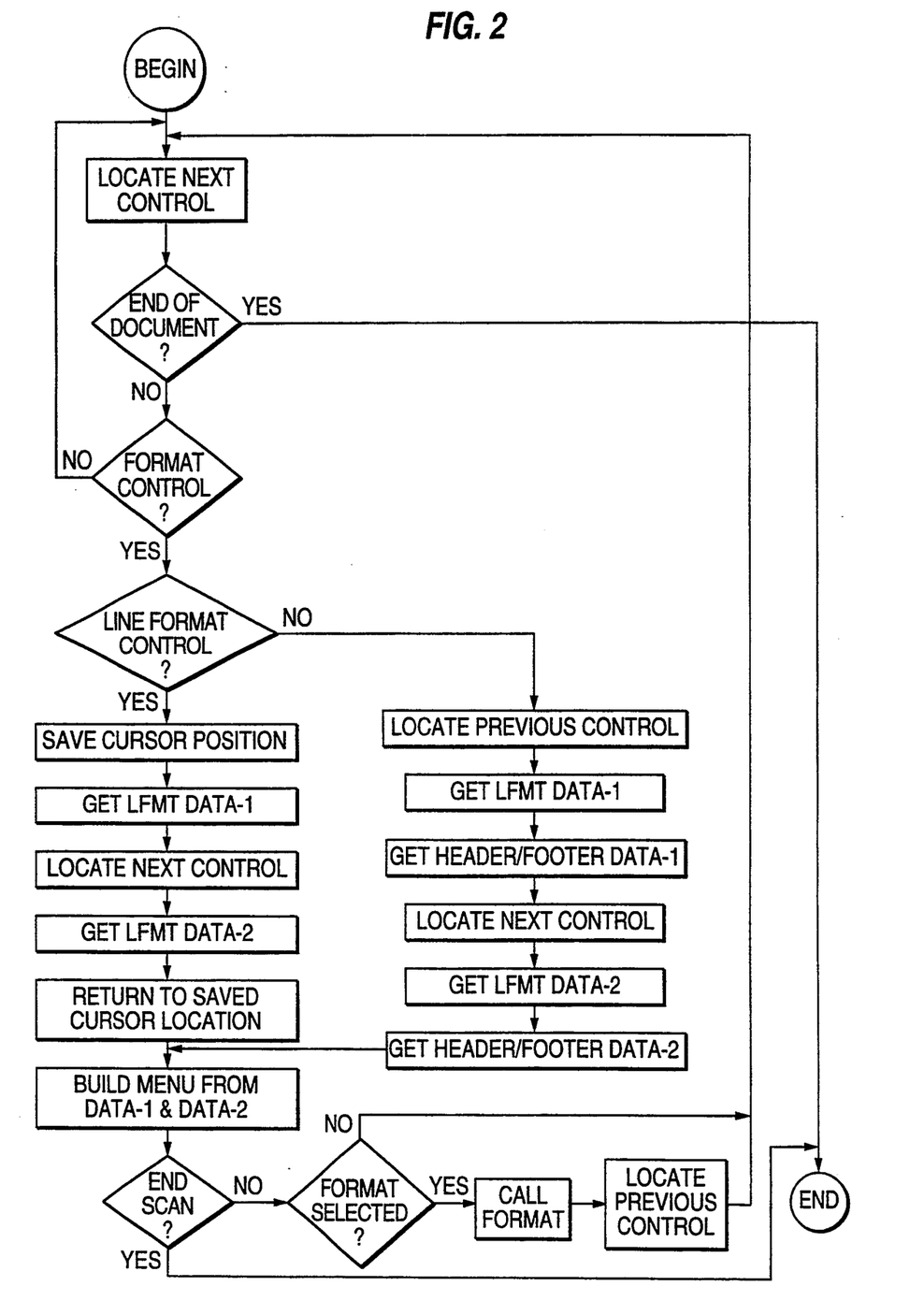
FIG. 2 is a flow diagram of the process for finding a format control and creating a menu of format characteristics which are in effect before and after the format control.

The ability of the LFMT function to retrieve the current format data enables the creation of the format scan code 30. The format scan code 30 locates a format control, takes before and after format characteristic data and builds a menu from this information. The flow diagram for this function is shown in FIG. 2.

When the user edits Document 50 for format controls, the format scan code 30 starts scanning the document either at the top of the document or at the current cursor location as specified by the user. If no format controls are located in the document, the format scan code 30 ends and the text processor is freed for other processing tasks. If a format control is found, the code 30 categorizes the format control as either a line format control or a page format control.

If a line format control is found, first, the cursor position is saved. Then the format characteristic data is taken at this location. The next control is then located and the format characteristic data are taken at the next control location. The code 30 then returns to the saved cursor location and proceeds to build the menu from the format characteristic data before and after the line format control.

If a page format control is found, the code 30 goes through a slightly different set of steps. First, the previous format control is located and the format characteristic data is taken at this location. Then, the code retrieves the header and footer information. This is an optional step which is performed only if the header and footer information is kept in the format characteristics data areas. The function returns to the page format control and retrieves the format characteristic data at the page format control location. Next, the header and footer information is retrieved if this information is kept in the format characteristic areas. The code then proceeds to build the menu from the format characteristic data before and after the page format control.

Both the menu displayed to the user at a line format control and the menu at a page format control allow the user to choose between three options. He may continue the search for later format controls, he may end the search or he may change the format values at the format control. If the user chooses to change the format values, he may do so by changing a particular parameter or set of parameters or by deleting the format control entirely.

Figure 4:
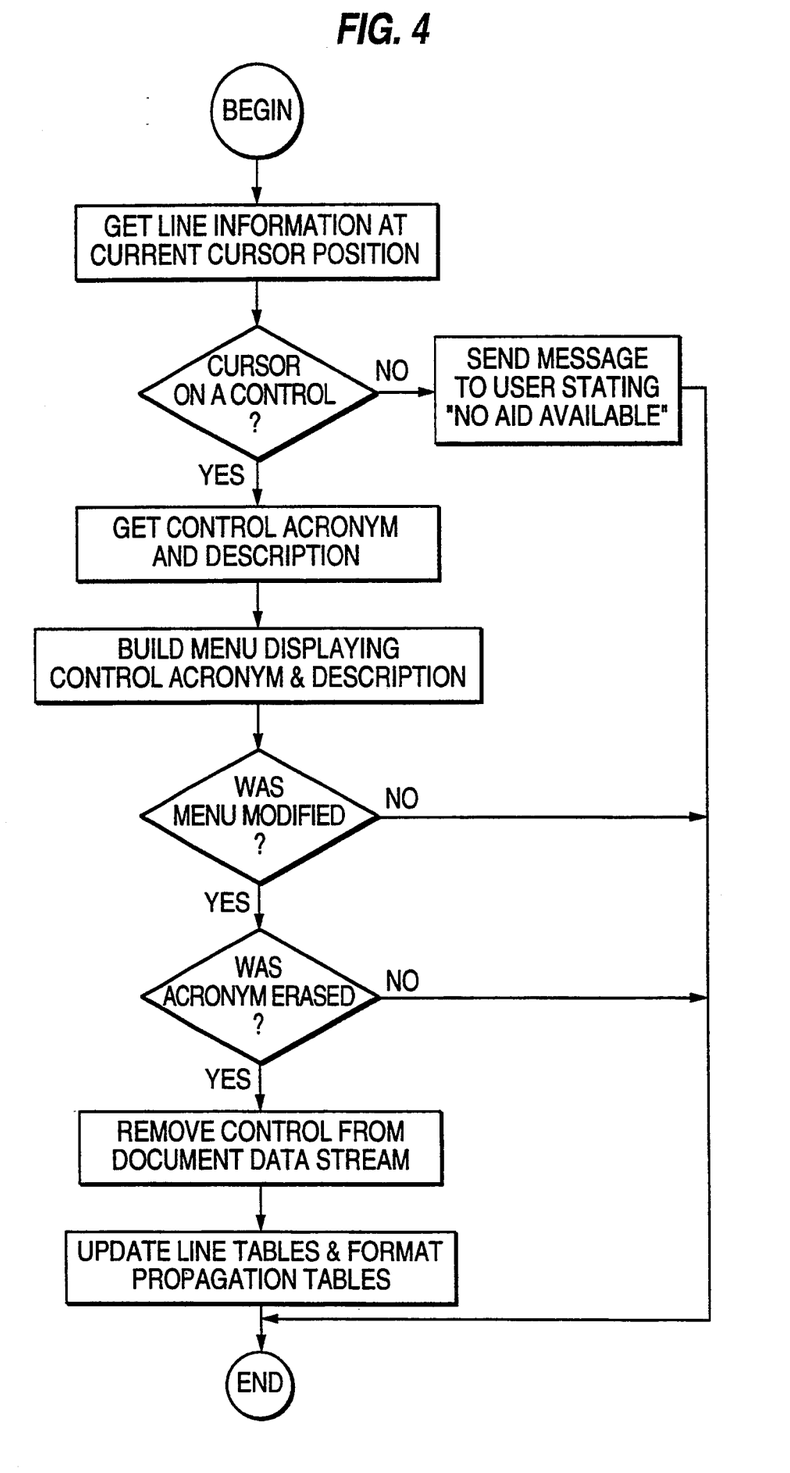
FIG. 4 is a flow diagram of the operation for deleting the format control in effect at the menu depicted in FIG. 6.

In the Appendix Table 2 shows a Document 50 as created on a text processor in accordance with the invention as displayed on alphanumeric display 40. In Document 50, six format controls are displayed: <LFC>, or line format change which contains new format characteristics for line length, line pitch, margins, tabs or fonts; <LFR>, or line format return, which returns the format characteristics to those of the current master format or to another previously defined set of format settings; <PFC>, or page format control which contains new format characteristics for page length, header, footer, page numbering, etc. as well as the format characteristics which the <LFC> can change; <PFR> which returns all format characteristics to those of the current master format; <SAF>, or start alternate format which tells the text processor to put into effect the format characteristics of the alternate format stored in the document format data area at the beginning of Document 50; and <SDF>, or start document format which tells the text processor to resume the format characteristics of the primary document format stored in the document format data area. Those skilled in the art would appreciate that the format controls presented in FIG. 4 are merely illustrative of the possible format controls. Other format controls which modify different subsets of the format characteristics are possible. The six format controls in Document 50 presented in the Appendix Table 2 are representative of the flexibility available in modern text processing systems.

In this example, and generally in a word processing document, each document has a document format and an optional alternate document format. The initial format characteristics are stored in a document format data area as shown in FIG. 1. Both the document format and the alternate format can exist in the same document, but only one can be active at a time. The format which is active is the current master format. In the preferred embodiment of the invention, the start alternate format control and the start document format control allow the user to switch back and forth between master formats.

Where a <PFC> or <LFC> control is used, all of the unchanged format characteristics as well as the new format characteristics are copied. These old format characteristics remain imbedded in the <PFC> or <LFC> control when a new document format is chosen, thus posing a potential trap for the unwary. Without utilizing the present invention, the user is reduced to a repetitive revise and print procedure to find each of the format controls in turn, since the effect of each format control is masked by the format control which preceeds it.

The other characters in the Appendix Table 2 surrounded by the <> characters, represent other control characters. For example, <CR>, <RCR> and <PE> stand for carrier return, required carrier return and page end respectively. Table 2 also shows page markers for each page represented by the dashed lines, which are useful to the user in understanding how the portions of text data will be placed within the document.

In the Appendix Table 3 depicts a line format change menu as it would appear to the user while editing the format controls in Document 50 shown in Table 2. At the top of the menu, the type of format control found by the format scan code 30 is displayed. In this example, the first format control is a line format change control, or <LFC>. Next, three columns are arranged in the menu: in the first column, the format characteristics which might be affected by the line format change control are listed. The next two columns list the old and new values for the format characteristics before and after the <LFC> control. Referring to Table 3, the line format change control has changed the line spacing from single spacing to double spacing, the line alignment from flush left to flush right and the font to be used for printing. The changes between the old and new values for the format characteristics can be highlighted on the menu. A variety of means of highlighting are available including: bold intensity, reverse video, and a different color. Because of the number of possible tab placements, it is not possible to describe them in a meaningful fashion within the menu. The line format change menu displays only whether the tabs have changed, the user must then go to a tab display within the format menus to determine the exact nature of the tab change. At the bottom of the <LFC> menu are possible choices available to the user at the menu: continue scan, [change] format, and end scan. These will be discussed in somewhat greater detail below.

In the Appendix Table 4, the page format change menu is depicted which would be displayed to the user if he elects to continue scanning for format changes in Document 50. In Document 50 as depicted in Table 2, the user would have first encountered a line format return menu, but as this is nearly identical to the line format control menu depicted in Table 3 with the values for the old and new values reversed, it was not depicted in a figure. The <PFC> menu has much the same format as the <LFC> menu except that a greater number of format characteristics can be modified using a page format change control.

Table 4 also presents a feature of the preferred embodiment which is to include header and footer information within the format data areas. Headers and footers can each require up to 1024 bytes of information. It becomes impractical to display all of this information within the page format change menu displayed in Table 4. The format scan code 30 retrieves header and footer information before and after the page format control. The menu includes only whether the header or footer has been changed. The user must go to a separate header or footer display to understand the changes.

In the Appendix Table 5 and 6 show another feature of the invention, the ability to scroll with a format change control menu. Depending on the number of lines which can be displayed on a given terminal, and the number of format characteristics which can be affected by the format control, it may not be possible to display the entire menu on a single screen. The ability to scroll within the menu provides an efficient means of accommodating the possible variety in display terminals and format controls.

If the user elects to continue scanning for format controls within Document 50, he would encounter a page format return <PFR>, a start alternate format <SAF> menu and a start document format <SDF> menu in turn.

After the menu is created, the user can elect to either continue scanning the document for the next format control, change the format values for the format characteristics in effect at the format control, or end the scan of the document to proceed to other text processing tasks. To continue to scan the document for more format control is rather straightforward. If this choice is selected by the user, the format scan code 30 simply goes back to the top of the flow diagram depicted in FIG. 2. If the user elects to continue scanning for a second format control, the method further comprises the steps of scanning the document database for a second format control, detecting the second format control, retrieving and storing information about the format characteristics in effect before and after the second format control, organizing the format characteristic information in a second menu, arid displaying that second menu to the user. Ending the scan of the document terminates the format scan code 30 and frees the data processing system for other tasks.

Figure 3:
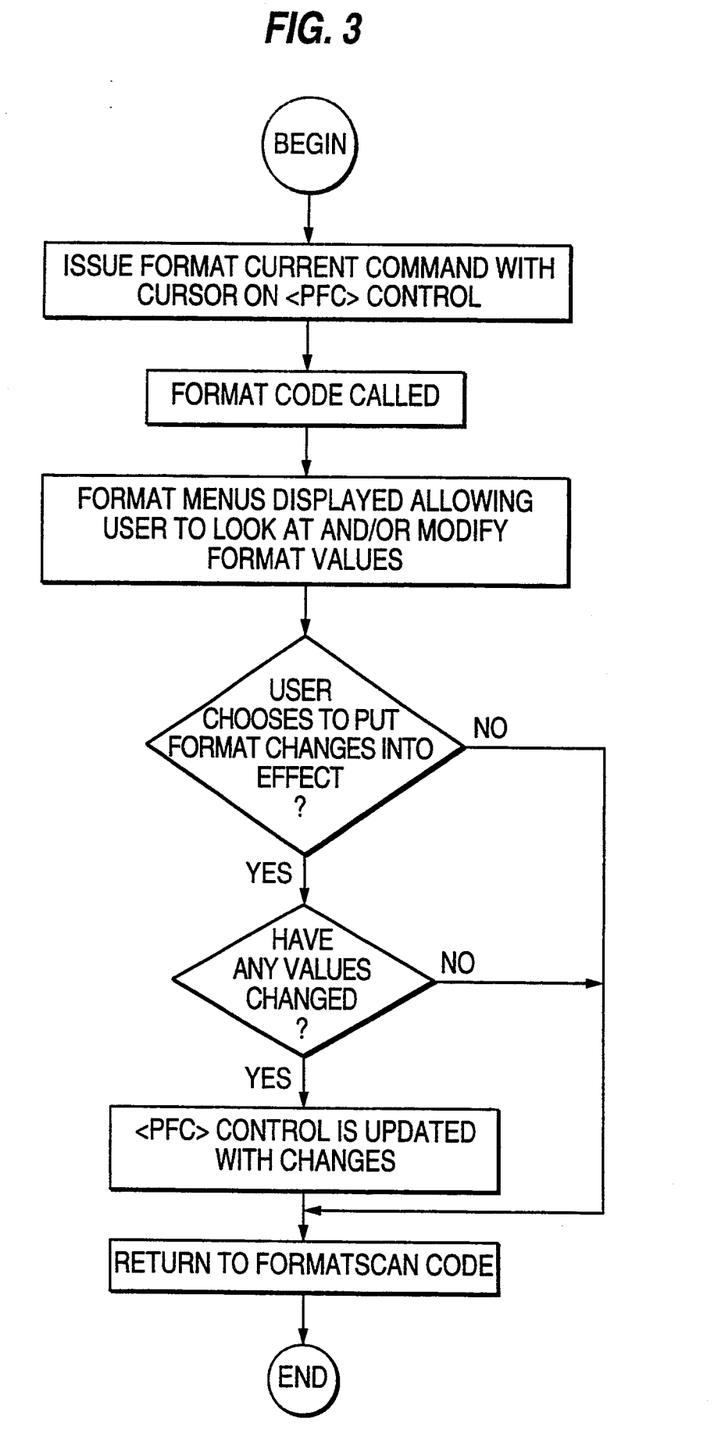
FIG. 3 is a flow diagram of the operation for changing a format value at the menu depicted in FIG. 6.

FIG. 3 depicts a flow diagram of the operation for changing a format value at the page format control menu depicted in Table 4. First, the user elects to change the page format control by choosing the [change] format command at the bottom of the PFC menu. This can call change menus which display and allow the user to modify the format characteristics associated with the page format control. If the user changes any of the format characteristics the page format control is updated, and the user is returned to the top of the format scan code 30. This returns the user to the page format change menu for the format control which has just been modified. The user can then determine whether the desired changes have been made in the format characteristics. If the desired changes have not been made, the user can revise again the format characteristics by choosing the change format con, and at the bottom of the PFC menu.

FIG. 4 is a flow diagram of the operation for deleting the format control in effect at the menu depicted in Table 4. The delete code first checks the current cursor position and checks to see whether the cursor is on a format control. If not, the code sends a message back to the user indicating that it is not possible to perform a delete operation. If the cursor is on a format control the delete code retrieves the format control acronym and description. The format control acronym is the three letter set which identifies what type of format control it is. For example, the format control acronym for a line format change control would be <LFC>. The format control description is the full word denoting the format control, e.g., "line format change".

This information may be displayed to the user on a delete menu where the user may elect to delete the format control. The user deletes the control by erasing the acronym on the menu. The code senses whether the user has erased the acronym. If he has done so, the format control is erased from the data stream and the various data areas, such as the initial page format, are updated accordingly.

There are other ways of implementing a change in format characteristics or a deletion of a format control. For example, rather than going to an additional set of menus, all changes could have been accomplished at the page format change menu itself by simply writing over the format characteristic values in the case of a change or by erasing the acronym on the page format change menu rather than the delete menu. The preferred embodiment opted to utilize these secondary change and delete menus since they were already supported in the data processing system wherein the invention was implemented. Using these secondary menus has an advantage in that the user need only learn a single way of performing the change format or delete format control operation.

In the Appendix Table 7 and 8 show the first two pages of Document 50 In their final printed form.

Although a specific embodiment of the invention has been disclosed, it will be understood by those having skill in the art that changes can be made to the specific embodiment without departing from the spirit and scope of the invention.

Appendix

Table 1 A mapping of a primitive function LFMT.

LFMT (Line Format)

| | |
|---|---|
| What is tells you: | paired cont    status at the cursor location |
| and | formatting information relevant to cursor |
| location. | |
| Type of Data: | string |
| Length: | Up to 208 characters |

Possible Values:  See below

```
1       Binary Settings
        *1... ....*         Keep Block in effect
        *.1.. ....*         Formatted Text in effect
4       Binary Settings
        *1... ....*         Underscore in effect
6       Underscore (0 = all, 3 = word)
7       Binary Settings
        *1... ....*         Emphasis in effect
9       Binary Settings
        *1... ....*         Overstrike in effect
14      Overstrike Character
15      Overstrike (0 = all, 3 = word)
18      Binary Settings
        *1... ....*         Page Format change in effect
        *.1.. ....*         Document Format in effect
        *..1. ....*         Alternate Format in effect
        *...1 ....*         Line Parameters and Tab Parameters are
                            modified
        *.... 1...*         Font is modified
19      Binary Settings
        *1... ....*         Page Format Change on page
        *.1.. ....*         Page Format Return on page
        *..1. ....*         Start Document Format on page
        *...1 ....*         Start Alternate Format on page
22      Number of Indent Tabs
23-24   Page Width in system units
25-26   Page Depth in system units
27-28   First body text line, first page in system units
29-30   First body text line, following pages in system units
31-32   Last body text line
34      Text color (0 = Black, 1 = Blue, 2 = Red, 3 = Pink,
                    4 = Green, 5 = Turquoise, 6 = Yellow)
35      Hyphenation (1 = off, 2 = on)
38-39   Font ID
40-41   Font Width in system units
47-48   Left Margin in system units
49-50   Right Margin in system units
51-52   Line Density in system units
53      Line Spacing in half-lines
54      Line Adjust (1 = on)

56      Hyphenation Zone
58      Justification Percentage (0, 50 100)
59      Alignment State (1 = Left, 2 = right, 3 = center,
                         4 = justify)
62      Type of Tabs (0 = floating, 1 = fixed)
63      Number of tab pairs present (0-48)
        For each tab pair present:
        1       Alignment (0 = left, 1 = period, 2 = center,
                           3 = comma, 4 = right, 5 = colon)
        2-3     Tab position relative to left margin
```

Table 2 A depiction of the appearance of a sample document as it would be displayed to a user on an alphanumeric display.

```
------------------------------------------------------------------- Page 1 -----
This document starts with the default format values shipped with <CR>
the product.  These changes are in stored in the Document Format <CR>
which is the master format currently in effect for this document.<RCR>
<RCR>
<LFC>A format change takes effect starting with this line.  This Line <CR>
Format Change (LFC) control changes the line spacing, line align<SHY><CR>
ment, and font.  However, without the FORMATSCAN command, a user, <CR>
to find out what format changes had been made, would have to <CR>
follow a scenario such as:<RCR>
<CR>
1) Move the cursor under the <LFC> control<RCR>
2) Bring up the floating command line<RCR>
3) Type FORMAT on the floating command line and press ENTER.<RCR>
4) The user would then be presented with the Line Format Selec<SHY><CR>
   tions menu, which lists 4 other menus the user must search to <CR>
   find out what format changes have been made.<RCR>
<RCR>
These 4 other menus (for Line, Margin, Tab, and Font) would con<SHY><CR>
tain the values in effect at this <LFC> control.  These 4 menus <CR>
only list the values in effect at this <LFC> control -- they do <CR>
not list what values where in effect prior to this <LFC> control.  <CR>
To find the values in effect prior to this control, again without <CR>
the FORMATSCAN command, the user would have to follow steps simi<SHY><CR>
lar to those listed above.  For a Page Format Change, a user would<CR>
have 8 menus to look at.<RCR>
<RCR>
<LFR>This line begins with a Line Format Return (LFR) control.  This <CR>
control changes the format to the values of the master format <CR>
currently in effect.  Again, the format changes are not apparent <CR>
to the user by just looking at the screen.<PE>
<PFC>------------------------------------------------------------- Page 2 -----
This page begins with a Page Format Change (PFC) control.  This <PFC> <CR>
control changes the first typing line, page depth, and font.<PE>
<PFR>------------------------------------------------------------- Page 3 -----
This page begins with a Page Format Return (PFR) control, which<CR>
returns the format to the values of the master format currently in <CR>
effect.<PE>
<SAF>------------------------------------------------------------- Page 4 -----
This page begins with a Start Alternate Format (SAF) control.  <CR>
Thus, the master format in effect at this point is the Alternate <CR>
Format.  This <SAF> control, changes the first and last typing <CR>
lines, page width and depth, line spacing, and text color at print <CR>
time.<PE>
<SDF>------------------------------------------------------------- Page 5 -----
This page begins with a Start Document Format (SDF) control, which<CR>
makes the master format in effect the Document Format and which <CR>
also returns the format values to the values stored in the Docu<SHY><CR>
ment Format.<PE>
```

Table 3 Depicts a line format change menu as it would be display to the user while scanning the document in Table 2.

FMTSCAN  RFT     C5                         FORMATSCAN                    Page 1
                                                                         ~ Life 0
===>
<---+_---1_---+_---2_---+_---3_--V+_---4_---+_---5_---+_---6_---+_>--7_---+_---
─────────────────────────────────────────────────────────────── Page 1 ──

```
┌─────────────────────────────────────────────────┐  ipped with
│                 FormatScan                      │  ent Format
│                                                 │  s document.
│ An <LFR> control has made these FORMAT changes: │
│                                                 │    This Line
│ Format Type        Old Value      New Value     │  line align-
│ Line                                            │  nd, a user,
│    Spacing            2              1          │  ave to
│    Density            6              6          │
│    Hyphenation Zone   6              6          │
│    Adjust            YES            YES         │
│    Alignment         RIGHT          LEFT        │
│    Color             BLACK          BLACK       │  ENTER.
│                                                 │  at Selec-
│ Margin                                          │   search to
│    Left               13             13         │
│    Right              79             79         │
│                                                 │  would con-
│ Font Number          1350            86         │  e 4 menus
│                                                 │  - they do
│ Tabs changed?                        NO         │  C> control.
│                                                 │  ain without
│ CONTINUE SCAN       FORMAT        END SCAN      │  steps simi-
│                                                 │  a user would
│ Move cursor to desired operation, Press ENTER.  │
└─────────────────────────────────────────────────┘
```

This line begins with a Line Format Return (LFR) control. This
control changes the format to the values of the master format
currently in effect. Again, the format changes are not apparent
to the user by just looking at the screen.
─────────────────────────────────────────────────────────────── Page 2 ──
This page begins with a Page Format Change (PFC) control. This <PFC>
control changes the first typing line, page depth, and font.
─────────────────────────────────────────────────────────────── Page 3 ──
This page begins with a Page Format Return (PFR) control, which
returns the format to the values of the master format currently in
effect.
─────────────────────────────────────────────────────────────── Page 4 ──
This page begins with a Start Alternate Format (SAF) control.
Thus, the master format in effect at this point is the Alternate
Format. This <SAF> control, changes the first and last typing
lines, page width and depth, line spacing, and text color at print

| PF 1=HELP | 2=Insert | 3=END | 4=Instr. | 5=RFind | 6=Aid |
| PF 7=Backward | 8=Forward | 9=Block | 10=Command | 11=Next | 12=Cmdline |

4A±                                                  a:BETVTVM1

Table 4 Depicts a page format change menu as it would be displayed to a user while scanning the document in Table 2.

```
                                   FORMATSCAN

===>
<---+ ---1 ---+ ---2 ---+ ---3 --V+ ---4 ---+ ---5 ---+ ---6 ---+ >--7 ---+ ---
currently in effect.  Again, the format changes are not apparent
to the user by just looking at the screen.
______________________________________________________________ Page 2 ____
This page begins with a Page Format Change (PFC) control. This <PFC>
control changes the first typing line, page depth, and font.
______________________________________________________________ Page 3 ____
                                                , which
     ┌──────────────────────────────────────┐   rrently in
     │           FormatScan                 │
     │                                      │   __________ Page 4 ____
     │ A <PFR> control has made these FORMAT changes:
     │                                      │   trol.
     │ Format Type      Old Value  New Value│   lternate
     │ Page                                 │   typing
     │   First typing line for:             │   r at print
     │       First page     10        7     │
     │       Following pages 10       7     │   __________ Page 5 ____
     │   Last typing line   60        60    │   rol, which
     │   Page Width         8.5       8.5   │   d which
     │   Page Depth         14        11    │   he Docu≡
     │                                      │
     │ Header Text changed?           NO    │   _______________________
     │                                      │
     │ Footer Text changed?           NO    │
     │                                      │
     │ Font ID              11        86    │
     │                                      │
     │ Line                                 │
     │   Spacing            1         1     │
     │   Density            6         6     │
     │   Hyphenation Zone   6         6     │
     │   Adjust             YES       YES   │
     │   Alignment          LEFT      LEFT  │
     │   Color              BLACK     BLACK │
     │                                      │
     │ Left Margin          13        13    │
     │ Right Margin         79        79    │
     │                                      │
     │ Tabs changed?                  NO    │
     │                                      │
     │ CONTINUE SCAN     FORMAT    END SCAN │
     │                                      │
     │ Move cursor to desired operation, Press ENTER.
     └──────────────────────────────────────┘
PF 1=HELP      2=Insert    3=END      4=Instr.    5=RFind      6=Aid
PF 7=Backward  8=Forward   9=Block    10=Command  11=Next      12=Cmdline
4A≛                                               a:BETVTVM1
```

Tables 5 and 6 depict the same page format change menu shown in Table 4 as it would be displayed to the user while scanning the document on a 24-line display device.

```
===>
<---+_---1_---+_---2_---+_---3_--V+_---4_---+_---5_---+_---6_---+_>--7_---+_--
to the user by just looking at the screen.
------------------------------------------------------------------ Page 2 ---
.----------------------- + + + -----------------------. . This <PFC>
!                                                      ! ont.
!              FormatScan                              !----------- Page 3 ---
!                                                      ! , which
! A <PFC> control has made these FORMAT changes:       ! rrently in
!                                                      !
! Format Type            Old Value      New Value      !----------- Page 4 ---
!   Page Depth              11             14          ! trol.
!                                                      ! lternate
! Header Text changed?                     NO          ! typing
!                                                      ! r at print
! Footer Text changed?                     NO          !
!                                                      !
! Font ID                   86             11          !----------- Page 5 ---
!                                                      ! rol, which
! CONTINUE SCAN          FORMAT          END SCAN      ! d which
!                                                      ! he Docu~
! Move cursor to desired operation, Press ENTER.       ! =RFind      6=Aid
'------------------------ + + + -----------------------' =Next      12=Cmdline
```

Table 5

```
===>
<---+_---1_---+_---2_---+_---3_--V+_---4_---+_---5_---+_---6_---+_>--7_---+_--
to the user by just looking at the screen.
------------------------------------------------------------------ Page 2 ---
.----------------------------------------------------. . This <PFC>
!                                                     ! ont.
!              FormatScan                             !----------- Page 3 ---
!                                                     ! , which
! A <PFC> control has made these FORMAT changes:      ! rrently in
!                                                     !
! Format Type            Old Value      New Value     !----------- Page 4 ---
! Page                                                ! trol.
!   First typing line for:                            ! lternate
!     First page              7             10        ! typing
!     Following pages         7             10        ! r at print
!   Last typing line         60             60        !
!   Page Width              8.5            8.5        !
!   Page Depth               11             14        !----------- Page 5 ---
!                                                     ! rol, which
! CONTINUE SCAN          FORMAT          END SCAN     ! d which
!                                                     ! he Docu~
! Move cursor to desired operation, Press ENTER.      ! =RFind      6=Aid
'---------------------- + + + ------------------------' =Next      12=Cmdline
```

Table 6

Tables 7 and 8 show the first and second pages of the document in Table 2 as it will appear in final printed form.--

This document starts with the default format values shipped with
    the product. These changes are in stored in the Document Format
    which is the master format currently in effect for this document.

A format change takes effect starting with this line. This Line Format Change (LFC) control changes the line spacing, line alignment, and font. However, without the FORMATSCAN command, a user, to find out what format changes had been made, would have to         follow a scenario such as:

1) Move the cursor under the <LFC> control

2) Bring up the floating command line

3) Type FORMAT on the floating command line and press ENTER.

4) The user would then be presented with the Line Format Selections menu, which lists 4 other menus the user must search to find out what format changes have been made.

These 4 other menus (for Line, Margin, Tab, and Font) would contain the values in effect at this <LFC> control. These 4 menus only list the values in effect at this <LFC> control -- they do not list what values where in effect prior to this <LFC> control. To find the values in effect prior to this control, again without the FORMATSCAN command, the user would have to follow steps similar to those listed above. For a Page Format Change, a user would have 8 menus to look at.

This line begins with a Line Format Return (LFR) control. This control changes the format to the values of the master format currently in effect. Again, the format changes are not apparent to the user by just looking at the screen.

Table 7

This page begins with a Page Format Change (PFC) control. This <PFC> control changes the first typing line, page depth, and font.

Table 8

We claim:

1. A document processing system for displaying to a user changes in format characteristics of a document due to format controls within a database representation of said document, said format controls containing format characteristic data, comprising:
memory means for storing a set of programs and said document database representation;
a format scan code stored in said memory means for scanning and detecting the presence of a first format control within said document database representation, for retrieving format characteristic data found in said format controls in said document database representation in effect preceding and following said first format control, for storing said format characteristic data in said random access memory, and for organizing said format characteristic data preceding and following said first format control in the same menu;
input means connected to said memory means for inputting user commands to said memory means;
display means connected to said memory means; and,
processing means connected to said memory means, said input means, and said display means, responsive to said user commands to scan said document database representation for format controls by activating said format scan code, said processing means including means for controlling said display means to display said format characteristic data preceding and following said format control in the same menu.

2. In a data processing system including a central processing unit, a random access memory, and a user terminal including display means and data input means, all coupled together by means of a system bus, a method for displaying to a user of said data processing system changes in format characteristics due to format controls within a database representation of a document, said format controls containing format characteristic data said method carried out by said central processor operating on a set of programs stored in said random access memory, said method comprising the steps of:
reading said document database representation into said random access memory from said system bus;

responsive to an input from the user, scanning for and detecting the presence of a first format control within said document database representation, and a preceding format control which first precedes said first format control in said document database representation;

retrieving format characteristic data found in said format controls in said document database representation describing a format of said document which precedes said first format control but which follows said preceding format control;

retrieving format characteristic data found in said format controls in said document database representation describing a format of said document which follows said first format control;

storing said format characteristic data retrieved preceding and following said first format control in said random access memory; and, displaying said format characteristic data on said display means to present said format characteristic data in effect preceding and following said first format control in the same menu.

3. The method of claim 2, which further comprises the step of altering said format control in response to an input from the user after said displaying step.

4. The method of claim 2, which further comprises the step of deleting said format control in response to an input from the user after said displaying step.

5. The method of claim 2, which further comprises the steps of:

responsive to a second input from the user, scanning for and detecting the presence of a second format control within said document database representation, and a second preceding format control which first precedes said second format control in said document database representation, retrieving format characteristic data found in said format controls in said document database representation describing a format of said document which precedes said second format control but which follows said second preceding format control;

retrieving format characteristic data found in said format controls in said document database describing a format of said document which follows said second format control;

storing said format characteristic data retrieved preceding and following said second format control in said random access memory; and, displaying said format characteristic data retrieved preceding and following said second format control in the same menu.

6. In a data processing system including a central processing unit, a random access memory, and a user terminal including display means and data input means, all coupled together by means of a system bus, a method for displaying to a user of said data processing system changes in format characteristics due to format controls within a database representation of a document, said format controls containing format characteristic data, said method carried out by said central processor operating on a set of programs stored in said random access memory, said method comprising the steps of:

reading said document database representation into said random access memory from said system bus;

responsive to an input from the user, scanning for and detecting the presence of a first format control within said document database representation and a following format control which first follows said first format control in said document database representation;

retrieving format characteristic data found in said format controls in said document database representation describing a format of said document which precedes said first format control;

retrieving format characteristic data found in said format controls in said document database representation describing a format of said document which follows said first format control, but which precedes said following format control;

storing said format characteristic data retrieved preceding and following said first format control in said random access memory; and, displaying said format characteristic data on said display means to present said format characteristic data in effect preceding and following said first format control in the same menu.

7. The method of claim 6, which further comprises the step of altering said format control in response to an input from the user after said displaying step.

8. The method of claim 6, which further comprises the step of deleting said format control in response to an input from the user after said displaying step.

9. The method of claim 6, which further comprises the steps of:

responsive to a second input from the user, scanning for and detecting the presence of a second format control within said document database representation, and a second following format control which first follows said second format control in said document database representation, retrieving format characteristic data found in said format controls in said document database representation describing a format of said document which precedes said second format control;

retrieving format characteristic data found in said format controls in said document database describing a format of said document which follows said second format control;

storing said format characteristic data retrieved before and after said second format control in said random access memory; and, displaying said format characteristic data retrieved preceding and following said second format control in the same menu to the user on said display means.

10. The method of claim 6 wherein said format control is a page format control.

11. The method of claim 6 wherein said format characteristic data describes format of headers and footers in said document.;

* * * * *